(12) United States Patent
Kuboyama et al.

(10) Patent No.: US 7,565,290 B2
(45) Date of Patent: Jul. 21, 2009

(54) SPEECH RECOGNITION METHOD AND APPARATUS

(75) Inventors: Hideo Kuboyama, Kawasaki (JP); Toshiaki Fukada, Yokohama (JP); Yasuhiro Komori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 11/165,167

(22) Filed: Jun. 24, 2005

(65) Prior Publication Data

US 2005/0288929 A1 Dec. 29, 2005

(30) Foreign Application Priority Data

Jun. 29, 2004 (JP) .............................. 2004-191460

(51) Int. Cl.
*G10L 15/00* (2006.01)
(52) U.S. Cl. .................. 704/251; 704/238; 704/246; 704/256; 704/252
(58) Field of Classification Search ................ 704/256, 704/238, 243, 245
See application file for complete search history.

(56) References Cited

U.S. PATENT DOCUMENTS

| | | | | |
|---|---|---|---|---|
| 5,621,859 A * | 4/1997 | Schwartz et al. | ............ | 704/256 |
| 5,787,396 A | 7/1998 | Komori et al. | ............ | 704/256 |
| 5,797,116 A | 8/1998 | Yamada et al. | ............ | 704/10 |
| 5,812,975 A | 9/1998 | Komori et al. | ............ | 704/256 |
| 5,845,047 A | 12/1998 | Fukada et al. | ............ | 395/2.77 |
| 6,018,628 A * | 1/2000 | Stoutamire | ............ | 717/147 |
| 6,076,056 A * | 6/2000 | Huang et al. | ............ | 704/254 |
| 6,108,628 A | 8/2000 | Komori et al. | ............ | 704/256 |
| 6,542,866 B1 * | 4/2003 | Jiang et al. | ............ | 704/255 |
| 6,662,159 B2 | 12/2003 | Komori et al. | ............ | 704/255 |
| 6,813,606 B2 * | 11/2004 | Ueyama et al. | ............ | 704/270.1 |
| 6,980,954 B1 * | 12/2005 | Zhao et al. | ............ | 704/251 |
| 2001/0053974 A1 * | 12/2001 | Lucke et al. | ............ | 704/240 |
| 2002/0128836 A1 | 9/2002 | Konuma et al. | | |

(Continued)

FOREIGN PATENT DOCUMENTS

JP 2001-312293 11/2001

(Continued)

OTHER PUBLICATIONS

V. Steinbiss et al., "Improvements in Beam Search," ICSLP 94: International Conference on Spoken Language Processing (1994: Yokohama, Japan), Acoustical Society of Japan, Sep. 1994, vol. 4, pp. 2143-2146.

(Continued)

*Primary Examiner*—Richmond Dorvil
*Assistant Examiner*—Leonard Saint Cyr
(74) *Attorney, Agent, or Firm*—Fitzpatrick, Cella, Harper & Scinto

(57) ABSTRACT

A speech recognition apparatus includes a word dictionary having recognition target words, a first acoustic model which expresses a reference pattern of a speech unit by one or more states, a second acoustic model which is lower in precision than said first acoustic model, selection means for selecting one of said first acoustic model and said second acoustic model on the basis of a parameter associated with a state of interest, and likelihood calculation means for calculating a likelihood of an acoustic feature parameter with respect to said acoustic model selected by said selection means.

8 Claims, 15 Drawing Sheets

U.S. PATENT DOCUMENTS

2004/0002867 A1* 1/2004 Nakagawa et al. .......... 704/275
2005/0075877 A1* 4/2005 Minamino et al. .......... 704/254

FOREIGN PATENT DOCUMENTS

JP    2002-215187    7/2002

OTHER PUBLICATIONS

W. Chou et al., "Minimum Error Rate Training of Inter-Word Context Dependent Acoustic Model Units in Speech Recognition," ICSLP 94: International Conference on Spoken Language Processing (1994: Yokohama, Japan), Acoustical Society of Japan, Sep. 1994, vol. 2, pp. 439-442.

* cited by examiner

CALCULATION USING PRECISION ACOUSTIC MODEL IS PERFORMED FOR STATES IN PHONEMES IMMEDIATELY AFTER BRANCHING OF BRANCH COUNT M (= 3) OR MORE, AND CALCULATION USING ROUGH ACOUSTIC MODEL IS PERFORMED FOR STATES IN OTHER PHONEMES

FIG. 13
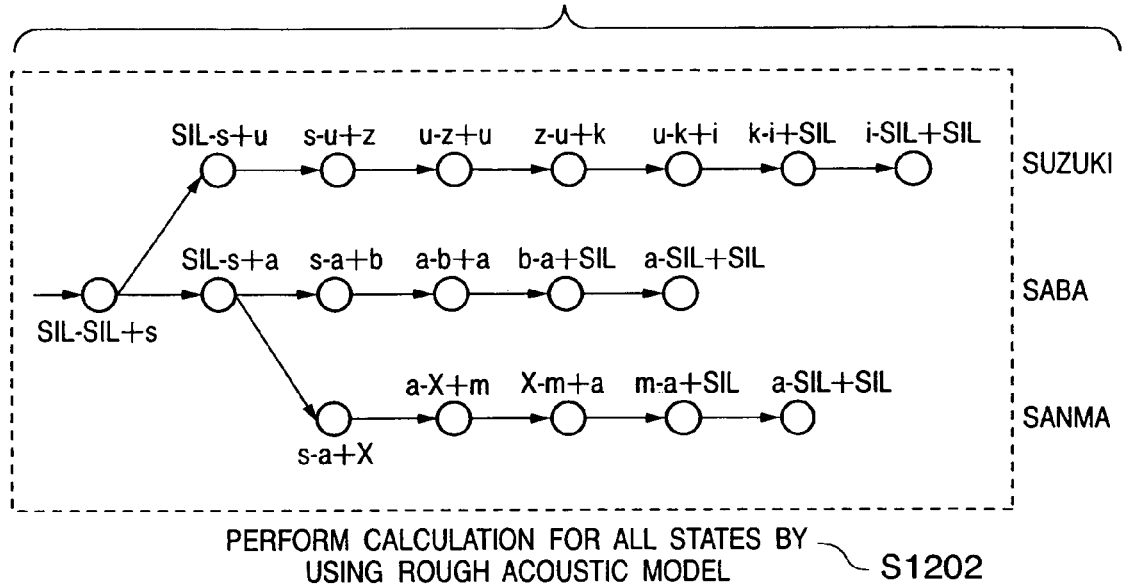
PERFORM CALCULATION FOR ALL STATES BY USING ROUGH ACOUSTIC MODEL — S1202
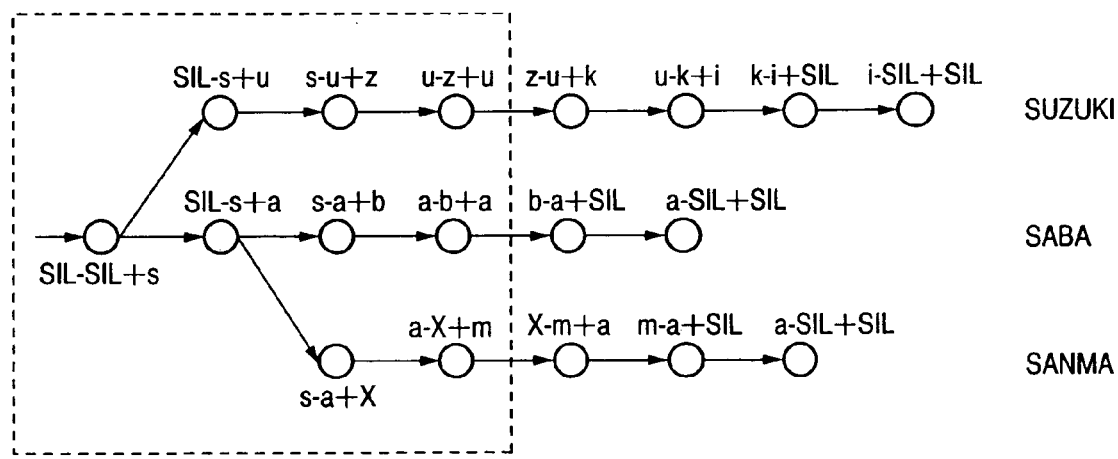
WITHIN N STATES FROM WORD START
THIRD STATE OF SIL-s+a
FIRST STATE OF s-a+b
FIRST STATE OF s-a+X
SECOND STATE OF s-a+X
S1203 — STATE EXHIBITING HIGH LIKELIHOOD IS PICKED UP FROM STATES WITHIN N STATES FROM WORD START, AND RE-CALCULATION IS PERFORMED BY USING PRECISION ACOUSTIC MODEL

SPEECH RECOGNITION METHOD AND APPARATUS

FIELD OF THE INVENTION

The present invention relates to a speech recognition method and apparatus for recognizing speech.

BACKGROUND OF THE INVENTION

Speech recognition has attracted attention as a user interface which allows anyone to easily input a command by speech. Recently, a speaker-independent speech recognition using a Hidden Markov Model (HMM) has been the mainstream.

Speech recognition in an embedded system, in particular, has a serious problem in terms of processing speed. Speech recognition processing is divided into acoustic analysis for obtaining a speech feature parameter and a process for calculating the likelihood of each recognition target word from the feature parameter by using a decoder. When the number of recognition target words increases or continuous speech recognition is to be performed to recognize a sentence comprising a plurality of words, in particular, a long processing time is required to perform likelihood calculation by using this decoder.

As a widely used method of increasing the recognition processing speed, a technique called beam search is available. In this technique, when likelihood calculation is to be performed time-synchronously, candidates with low likelihoods are excepted at each time of calculation to omit them from subsequent calculation. In general, any candidates that do not reach the value obtained by subtracting a predetermined value from the maximum likelihood within the same time range are excepted.

Other than this method, methods of decreasing the number of candidates have been studied. For example, V. Steinbiss, B. H. Tran, H. Ney, "Improvements in Beam Search", Proceedings ICSLP, Yokohama, 1994, vol. 4, pp. 2143-2146 has proposed a method of decreasing the number of candidates by setting a imitation on the number of candidates at each time of calculation.

In addition, Japanese Patent Application Laid-Open No. 2002-215187 (corresponding to US2002/128836A1) discloses a technique of decreasing the calculation amount, while maintaining high precision, by performing this candidate count limitation only at a word end without performing it for calculation inside the word.

Furthermore, Japanese Patent Application Laid-Open No. 2001-312293 discloses, as a method of decreasing the calculation amount by devising an acoustic model, a technique of generating a merged phoneme tree by merging similar phonemes, performing likelihood calculation based on this tee, and when a unique solution cannot be obtained, performing collation again with the original phoneme, thereby decreasing the calculation amount. The same reference also discloses a technique of roughly performing likelihood calculation from the word start of a vocabulary to the Nth phoneme by using a rough acoustic model, and accurately performing likelihood calculation for the remaining phonemes by using a precision acoustic model, thereby decreasing the calculation amount.

FIG. 15 shows an example of a tree formed from recognition target words. Referring to FIG. 15, "SIL−s+a" represents a triphone with SIL (silence), s, and a respectively representing a forward phoneme, a central phoneme, and a backward phoneme.

According to Japanese Patent Application Laid-Open No. 2001-312293, calculation near a word start is performed by using a rough model to reduce tree branching, and a solution is determined later by re-collation.

In general, however, tree branching tends to occur many times near a word start. In this case, if a triphone is replaced with a rough model, e.g., a monophone independent of neighboring phonemes, at a position where forward branching often occurs, both SIL−s+u and SIL−s+a become s. As a result, there is no considerable likelihood difference at branches, and the precision of the model deteriorates.

Assume that each reference phoneme pattern of an acoustic model is expressed by a plurality of Gaussian distributions. In this case, if a rough model with a small number of Gaussian distributions is used at a word start, since the phoneme cannot be sufficiently expressed, the likelihood deteriorates, resulting in a deterioration in likelihood calculation precision.

It is therefore necessary to develop another technique of reducing the amount of likelihood calculation while avoiding the above problems and maintaining the precision of the calculation.

SUMMARY OF THE INVENTION

In one aspect of the present invention, a speech recognition apparatus includes a word dictionary having recognition target words, a first acoustic model which expresses a reference pattern of a speech unit by one or more states, a second acoustic model which is lower in precision than the first acoustic model, selection means for selecting one of the first acoustic model and the second acoustic model on the basis of a parameter associated with a state of interest, and likelihood calculation means for calculating a likelihood of an acoustic feature parameter with respect to the acoustic model selected by the selection means.

The above and other objects and features of the present invention will appear more fully hereinafter from a consideration of the following description taken in connection with the accompanying drawing wherein one example is illustrated by way of example.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a view for explaining an example of processing in likelihood calculation in the seventh modification;

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

The present invention is directed to maintain sufficiently high precision by performing precision likelihood calculation at a word start or branch even if rough likelihood calculation is done in other states, rather than to decrease the number of branches of a tree and reduce processing at a word start.

As described above, according to the present invention, likelihood calculation is performed by using a precision acoustic model near a word start or in a state wherein tree branching occurs many times, and likelihood calculation is performed by using a rough acoustic state in other states. Note that W. Chou, C. H. Lee, B. H. Juang, "MINIMUM ERROR RATE TRAINING OF INTER-WORD CONTEXT DEPENDENT ACOUSTIC MODEL UNITS IN SPEECH RECOGNITION", Proceedings ICSLP, Yokohama, 1994, vol. 9, pp. 439-442 has proposed a method of precisely separating models depending on all combinations of preceding words and succeeding words which may be connected at word starts and word ends, respectively, in order to make acoustic models at word starts and word ends precise. However, the method of the present invention which increases the number of Gaussian distributions mixed in a precision acoustic models is another method independent of preceding words. In addition, a method using a triphone for a precision acoustic model is another method because the method determines a model depending on the phonemes of a preceding word instead of determining a model for each preceding word. In this reference, there is no description about the switching of these acoustic precision models in accordance with the number of branches regardless of a word start.

A preferred embodiment of the present invention will be described in detail below with reference to the accompanying drawings.

Figure 1:
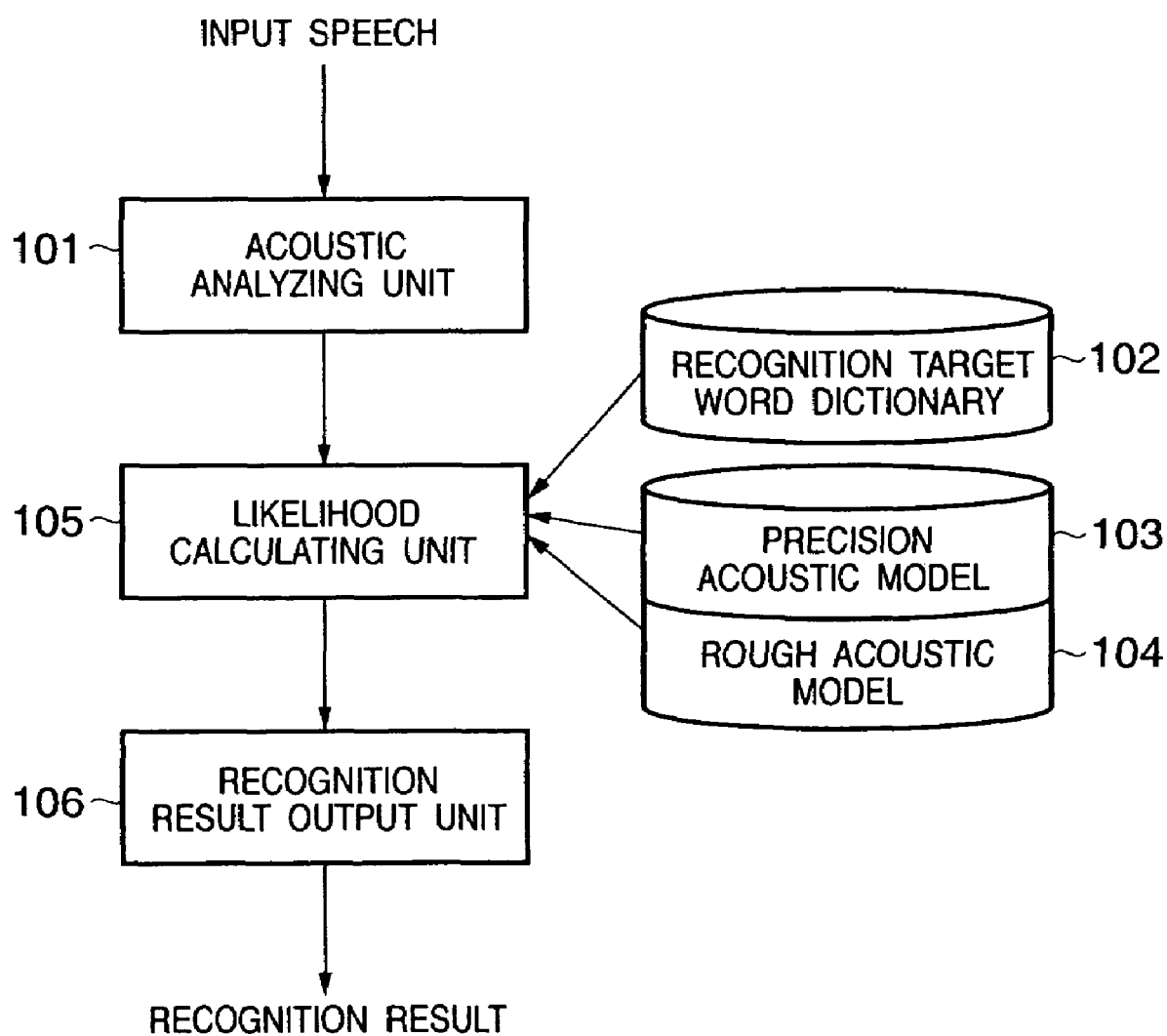
FIG. 1 is a block diagram showing the function implemented by a speech recognition apparatus according to an embodiment of the present invention.

FIG. 1 is a block diagram showing the function of a speech recognition apparatus according to this embodiment. Referring to FIG. 1, reference numeral 101 denotes an acoustic analyzing unit which obtains a speech feature parameter by analyzing speech; 102, a recognition target word dictionary which holds a recognition target word used for speech recognition; 103, a precision acoustic model (first acoustic model) which is a precision reference pattern in a predetermined speech unit (e.g., a monophone, triphone, or word); and 104, a rough acoustic model (second acoustic model) as a rough reference pattern in a speech unit. Examples of specific arrangements of the precision acoustic model 103 and rough acoustic model 104 will be described later. Reference numeral 105 denotes a likelihood calculating unit which receives the acoustic feature parameter obtained by the acoustic analyzing unit 101 and calculates a likelihood by using the recognition target word dictionary 102, precision acoustic model 103, and rough acoustic model 104; and 106, a recognition result output unit which determines a recognition result on the basis of the likelihood obtained by the likelihood calculating unit 105, and outputs it. Rough acoustic model 104 is lower in precision than said precision acoustic model 103.

Figure 2:
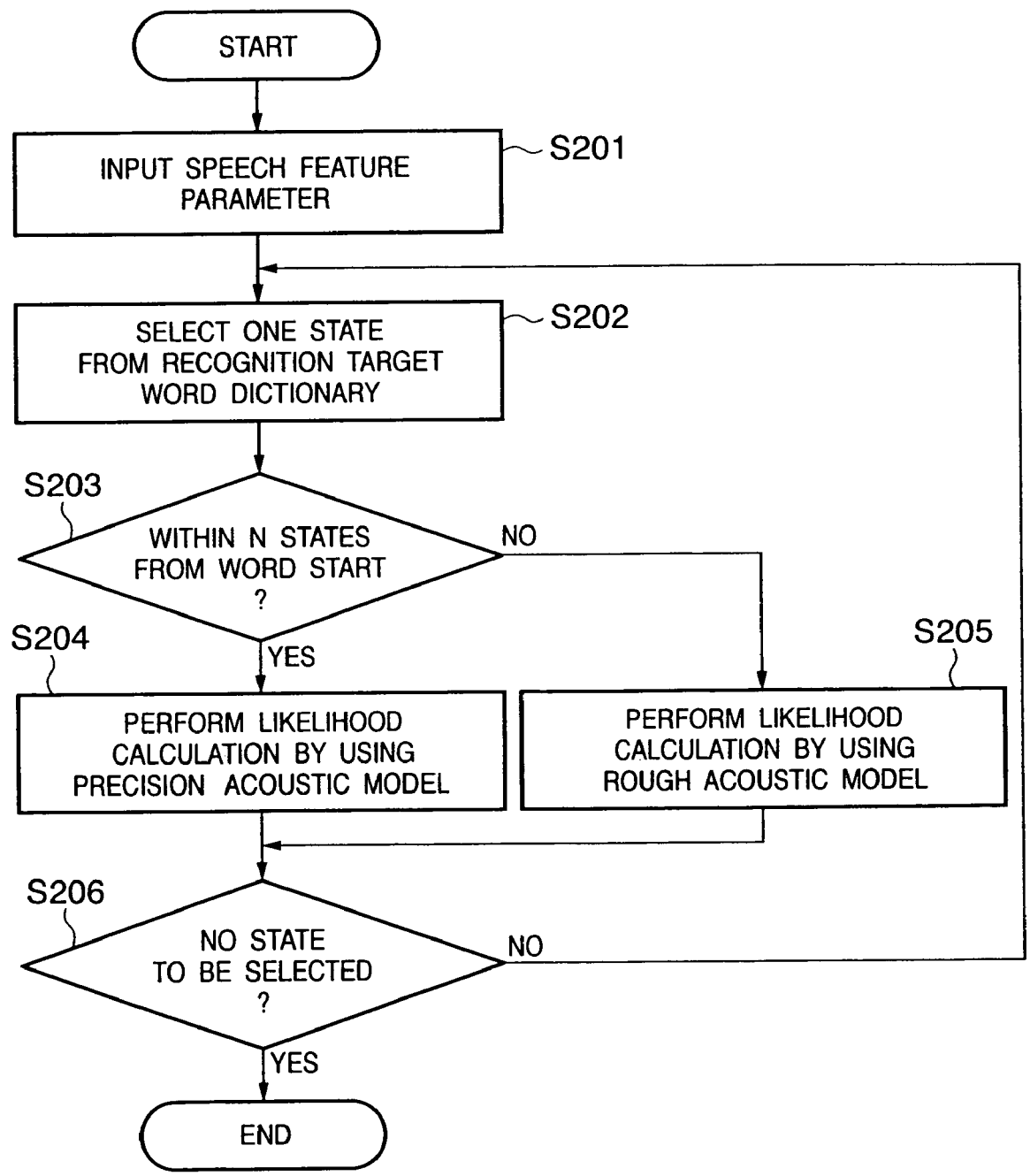
FIG. 2 is a flowchart showing an example of likelihood calculation in the embodiment of the present invention.

FIG. 2 is a flowchart showing processing performed by the likelihood calculating unit 105. First of all, in step S201, a speech characteristic parameter is input to the likelihood calculating unit 105 for each predetermined time interval (frame) of the input speech obtained by the acoustic analyzing unit 101. In step S202, one state of the recognition target word dictionary 102 is selected.

Figure 3:
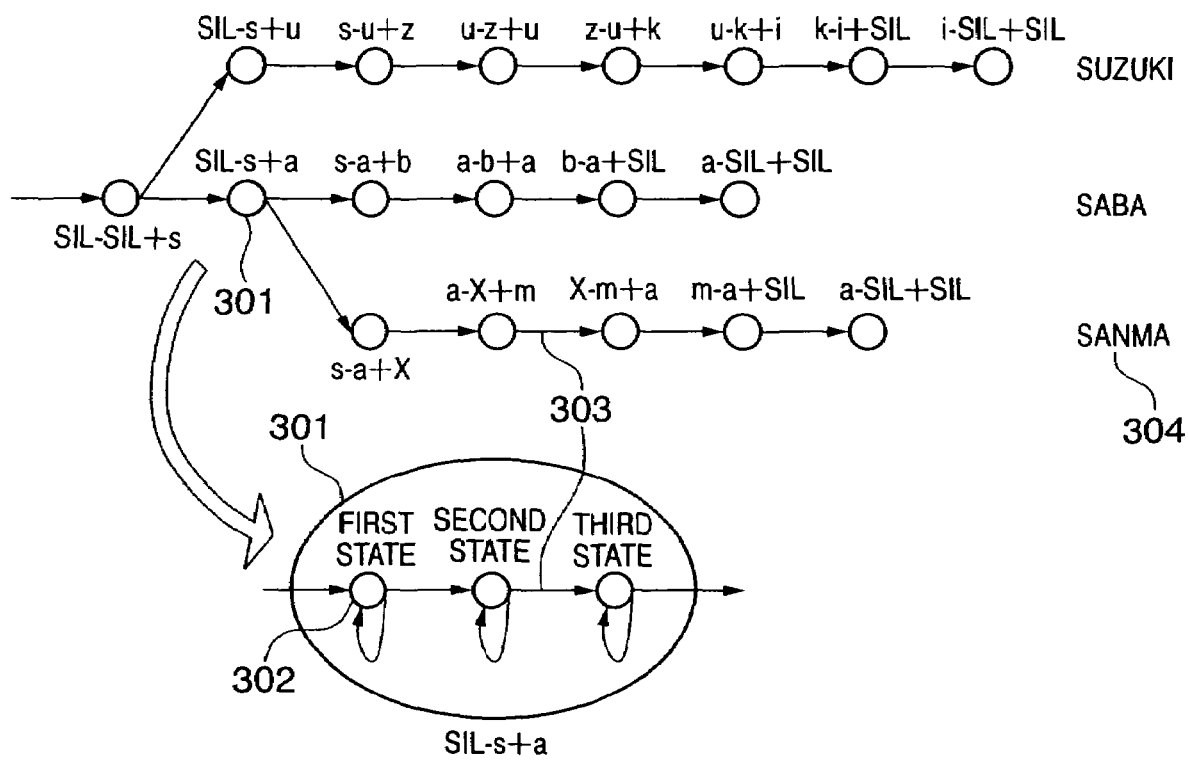
FIG. 3 is a view conceptually showing an example of the structure of a recognition target word dictionary in the embodiment of the present invention.

FIG. 3 is a view schematically showing an example of the structure of the recognition target word dictionary 102. Referring to FIG. 3, reference numeral 301 denotes a node which represents a phoneme obtained by dividing each recognition target word, and "SIL–s+a" represents a triphone with SIL (silence), s, and a respectively representing a preceding phoneme, a central phoneme, and a succeeding phoneme. Reference numeral 302 denotes a state which forms a phoneme. Referring to FIG. 3, one phoneme is expressed by three states. Reference numeral 303 denotes a link representing a path which connects nodes in adjacent states and makes state transition at a time.

As shown in FIG. 3, the recognition target word dictionary 102 forms a tree structure by making other words share common phonemes from a word start. When a branch reaches its end, a recognition target word like the one denoted by reference numeral 304 is formed.

Refer back to the flowchart of FIG. 2. In step S202, the states 302 are sequentially selected from the word start of the tree. In step S203, a parameter associated with the selected state is checked. More specifically, it is checked whether the selected state is contained between the word start of the tree and the Nth state (e.g., N=12). If the selected state falls within the N states, the flow advances to step S204 to perform likelihood calculation by using the precision acoustic model 103. If the selected state is not contained between the word start and the Nth state, the flow advances to step S205 to perform likelihood calculation by using the rough acoustic model 104.

In step S206, it is determined whether or not the processing for all the states is complete. If the processing for all the states is complete, this processing is terminated. If processing for the next state still remains undone, the flow returns to step S202 to repeat processing. In this case, "all the states" exclude those in which state transition is not complete at present. For example, the shortest time for which state transition reaches the first state of the fourth phoneme "u–z+u" of the word "Suzuki" from the word start is a time value of 7. Therefore, state transition cannot reach the second and subsequent states of "u–z+u" at the seventh time, likelihood calculation for these states is excluded.

Likelihood calculation in this embodiment will be described in detail next.

The precision acoustic model 103 and rough acoustic model 104 hold the state transition probabilities of phonemes in the respective states, the mean, variance, and mixed weight of one or two or more Gaussian distributions expressing output probability distributions in correspondence with the respective phonemes contained in the recognition target word dictionary 102. The likelihood calculating unit 105 calculates a likelihood by accumulating the logarithmic values of output probabilities and state transition probabilities in the respective states from the start time of speech.

The calculation amount for a likelihood increases as the mixture count of a model (the number of Gaussian distributions) increases. If, however, the mixture count decreases, phonemes cannot be expressed with high precision. For this reason, according to this embodiment, a model with a large mixture count is used as the precision acoustic model 103, and a model with a small mixture count is used as the rough acoustic model 104.

Figure 4:
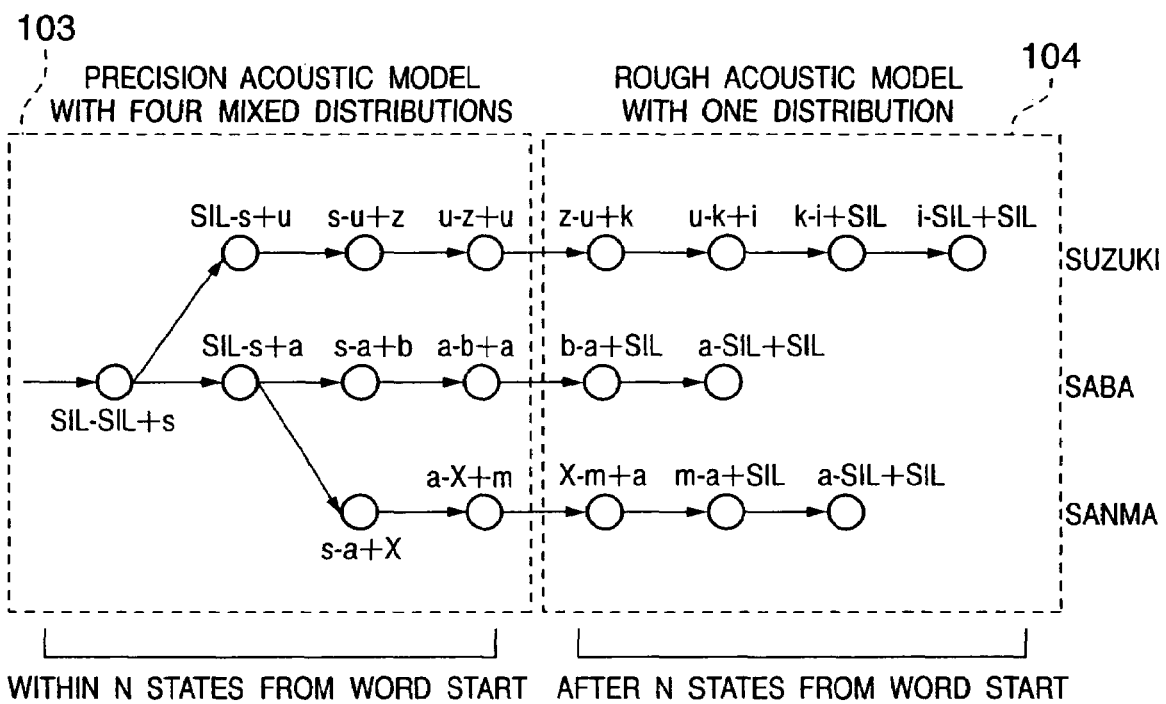
FIG. 4 is a view showing examples of the arrangements of a precision acoustic model and rough acoustic model in the embodiment of the present invention.

FIG. 4 shows an example of this operation. Since a precision acoustic model with four mixed distributions is used for states from a word start to the Nth state (referring to FIG. 4, N states=4 phonemes×3 states=12 states), high-precision likelihood calculation is performed although the calculation amount increases. For states beyond the N states from the word start, a rough acoustic model with one distribution is used, and hence the precision of likelihood calculation decreases. However, likelihood calculation can be done at high speed.

In the above example, different numbers of Gaussian distributions mixed are used for the precision acoustic model 103 and rough acoustic model 104. Various modifications of the arrangements and likelihood calculation procedures of the precision acoustic model 103 and rough acoustic model 104, other than those described above, are conceivable.

(First Modification)

For example, the precision acoustic model 103 can be differentiated from the rough acoustic model 104 by setting different phoneme units. More specifically, for example, a triphone model designed such that a phoneme is classified depending on its two adjacent phonemes is used as the precision acoustic model 103, and a monophone model designed such that each phoneme has a reference pattern regardless of adjacent phonemes is used as the rough acoustic model 104.

Figure 5:
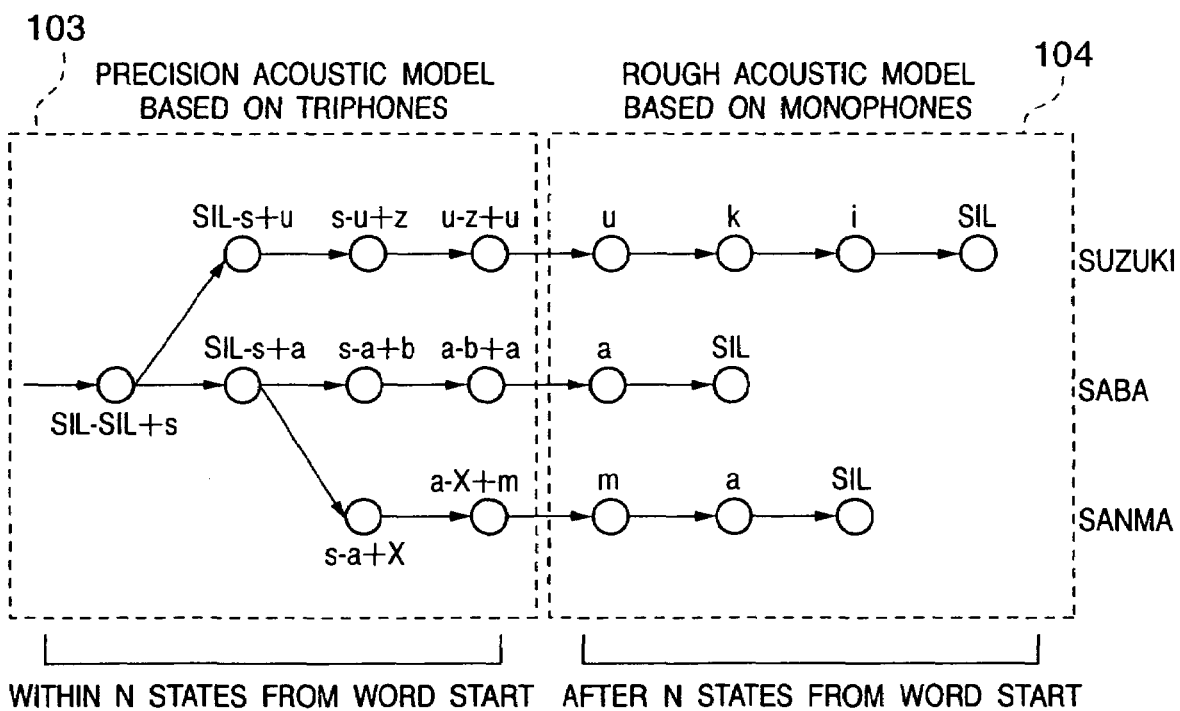
FIG. 5 is a view showing examples of the arrangements of a precision acoustic model and rough acoustic model according to the first modification.

FIG. 5 shows an example of this operation. Referring to FIG. 5, a triphone model is used for states from a word start to the Nth state (N states=4 phonemes×3 states=12 states). A triphone is a model designed such that each combination of three phonemes, i.e., a central phoneme and two adjacent phonemes, has a reference pattern. For example, "SIL−s+a" represents the phoneme "s" with the phoneme "SIL" (silence) and the phoneme "a" being the preceding and succeeding phonemes, respectively. In contrast to this, a monophone model is designed such that the central phoneme "s" is expressed as one reference pattern as a whole regardless of the two adjacent phonemes. For this reason, a triphone can express a phoneme more precisely.

In this case, with regard to a phoneme calculated once at a given time, the likelihood calculating unit 105 can use the calculation result for the phoneme appearing in another place of a recognition target word. For example, referring to FIG. 5, using a calculation result obtained for the monophone "a" contained in the word "saba" makes it unnecessary to perform calculation for the monophone "a" contained in the word "sanma". Reusing this calculation result can increase the calculation processing speed. In this case, a monophone is higher in reusability than a triphone because it does not depend on the two adjacent phonemes, and allows an increase in processing speed. In this modification, therefore, as shown in FIG. 5, the triphone model is used for the states from the word start to the Nth state to perform high-precision likelihood calculation, and the monophone model is used for states beyond N states from the word start to perform high-speed processing.

(Second Modification)

In the first modification, in order to facilitate the reuse of a likelihood calculation result for each phoneme, a monophone model is used as a rough acoustic model which is used for phonemes beyond the N states from a word start. At this time, if there is a phoneme coinciding with a triphone for which calculation has been done within the N states, likelihood calculation can be performed with high precision at high speed by using the calculation result.

Figure 6:
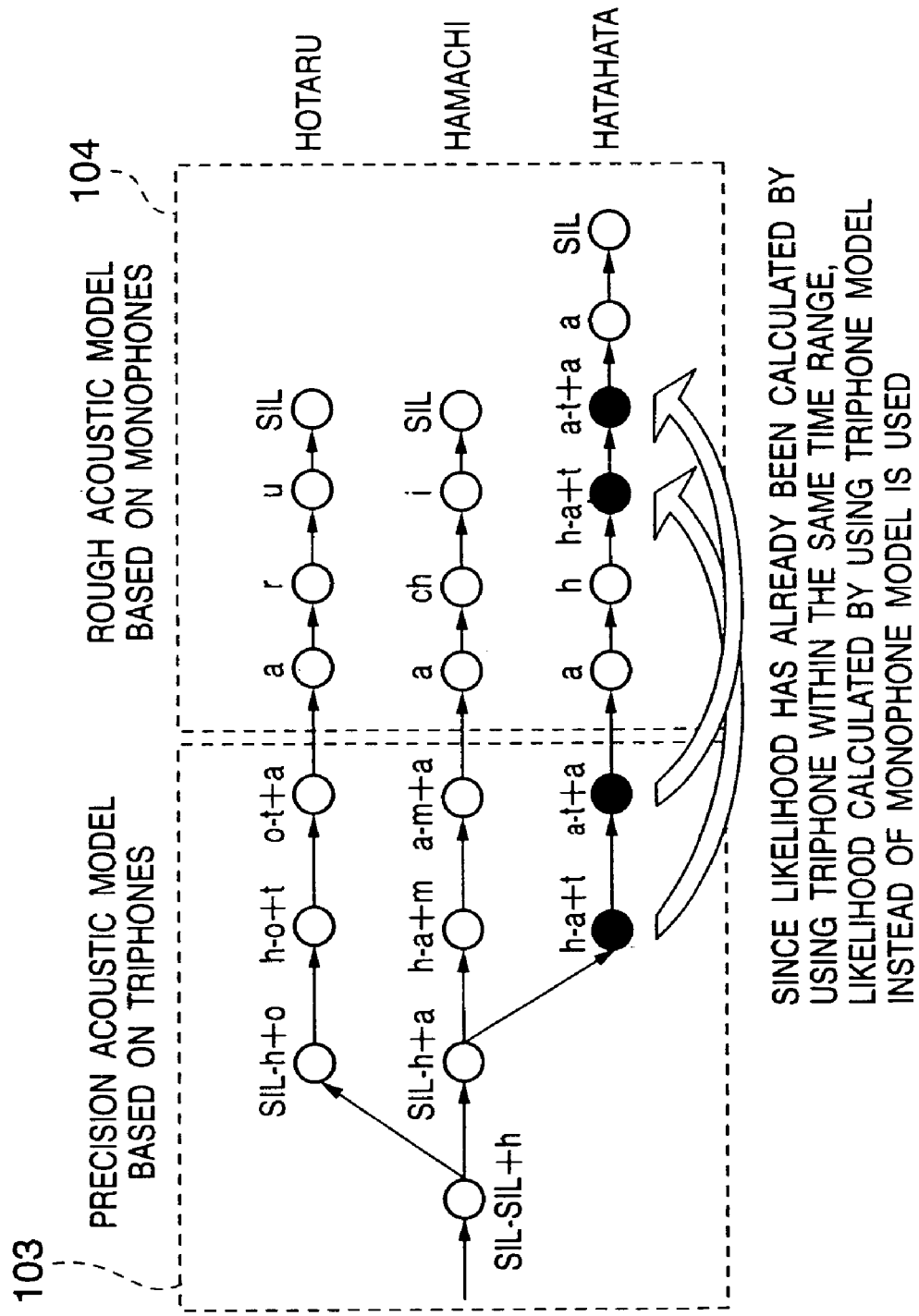
FIG. 6 is a view for explaining an example of likelihood calculation in the second modification.

FIG. 6 shows this state. Referring to FIG. 6, the seventh and eighth phonemes of the word "hatahata" are the monophones "a" and "t", respectively, and calculation for them is performed by using this rough acoustic model (if calculation has already been performed for "a" occurring in "hotaru" or "hamachi", the calculation result is reused for "a"). These phonemes can be expressed by triphones, which take into account preceding and succeeding phonemes, like "h−a+t" and "a−t+a". These phonemes "h−a+t" and "a−t+a" occur in the third and fourth triphones of "hatahata" which fall within the N states and are calculated by using a precision acoustic model, and the calculation results obtained by using the precision acoustic model can be reused. This makes it possible to perform high-speed processing while preferably using the likelihood calculation results obtained by the precision acoustic model.

In addition, a similar method can be applied to a case wherein the number of distributions mixed for the precision acoustic model 103 is made to differ from that for the rough acoustic model 104.

Figure 7:
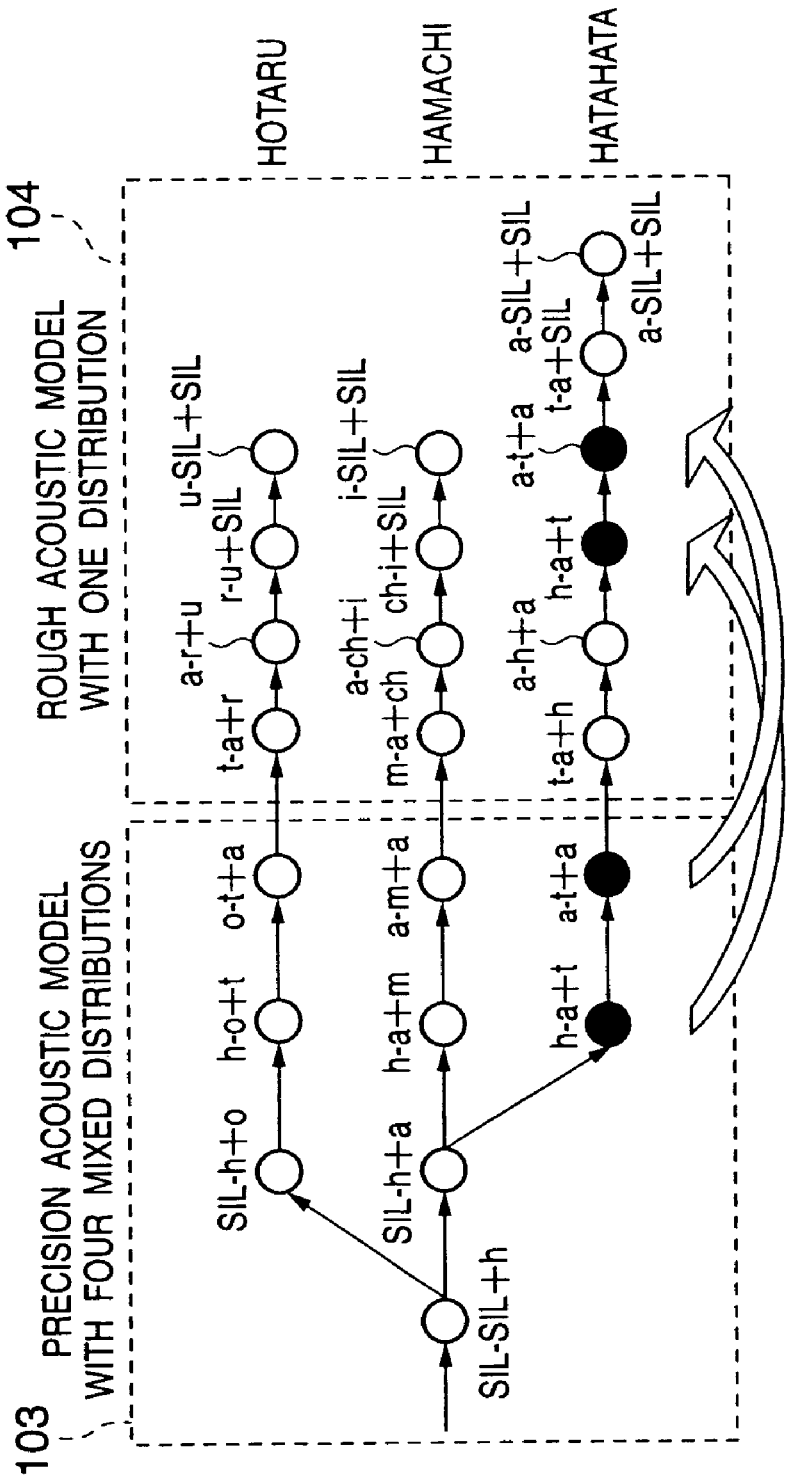
FIG. 7 is a view for explaining another example of likelihood calculation in the second modification.

FIG. 7 shows this case. Referring to FIG. 7, an acoustic model with four mixed distributions is used as a precision acoustic model, and an acoustic model with one distribution is used as a rough acoustic model. As in the case shown in FIG. 6, high-precision, high-speed processing can be performed by reusing the results which have already been calculated by using the acoustic model with four mixed distributions within N states for states in the seventh and eighth phonemes "h−a+t" and "a−t+a" of the word "hatahata" instead of performing likelihood calculation using the rough acoustic model with one distribution.

(Third Modification)

In this embodiment, it is determined whether the precision acoustic model 103 or rough acoustic model 104 is used, depending on the decision in step S203 whether or not the current state falls within the N states from the word start of the vocabulary. As a substitute, the number of branches of the current state may be checked as a parameter associated with the current state of interest, and the acoustic models may be switched in accordance with the number of branches.

Figure 8:
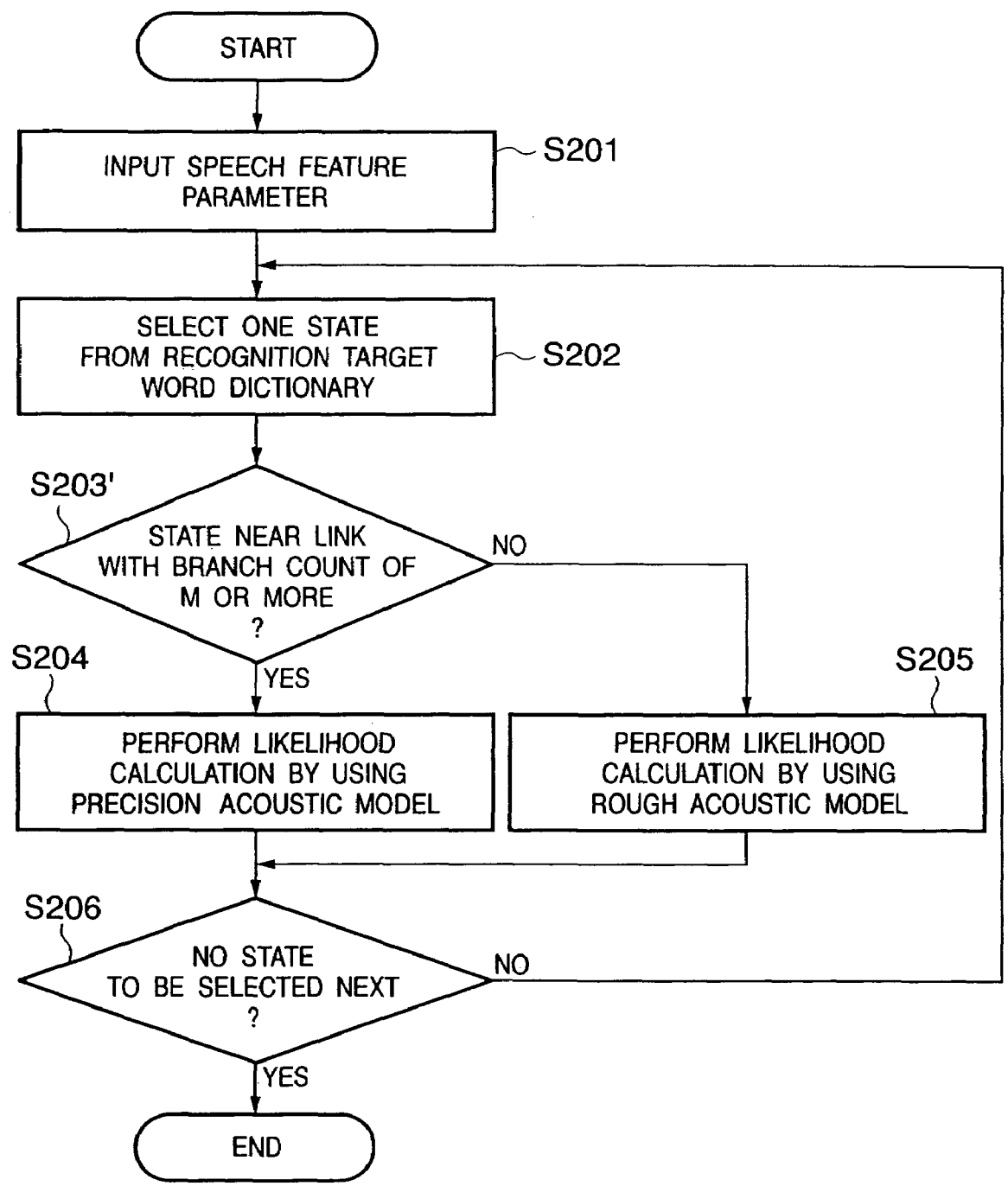
FIG. 8 is a flowchart showing an example of likelihood calculation in the third modification.

FIG. 8 is a flowchart showing likelihood calculation in this modification. This flowchart differs from the flowchart of FIG. 2 in step S203' executed in place of step S203, but the remaining steps are the same as those in FIG. 2. In step S203', it is determined whether or not branches equal to or more than a predetermined value exist near the current state. If YES in step S203', the precision acoustic model 103 is used. If NO in step S203', the rough acoustic model 104 is used.

Figure 9:
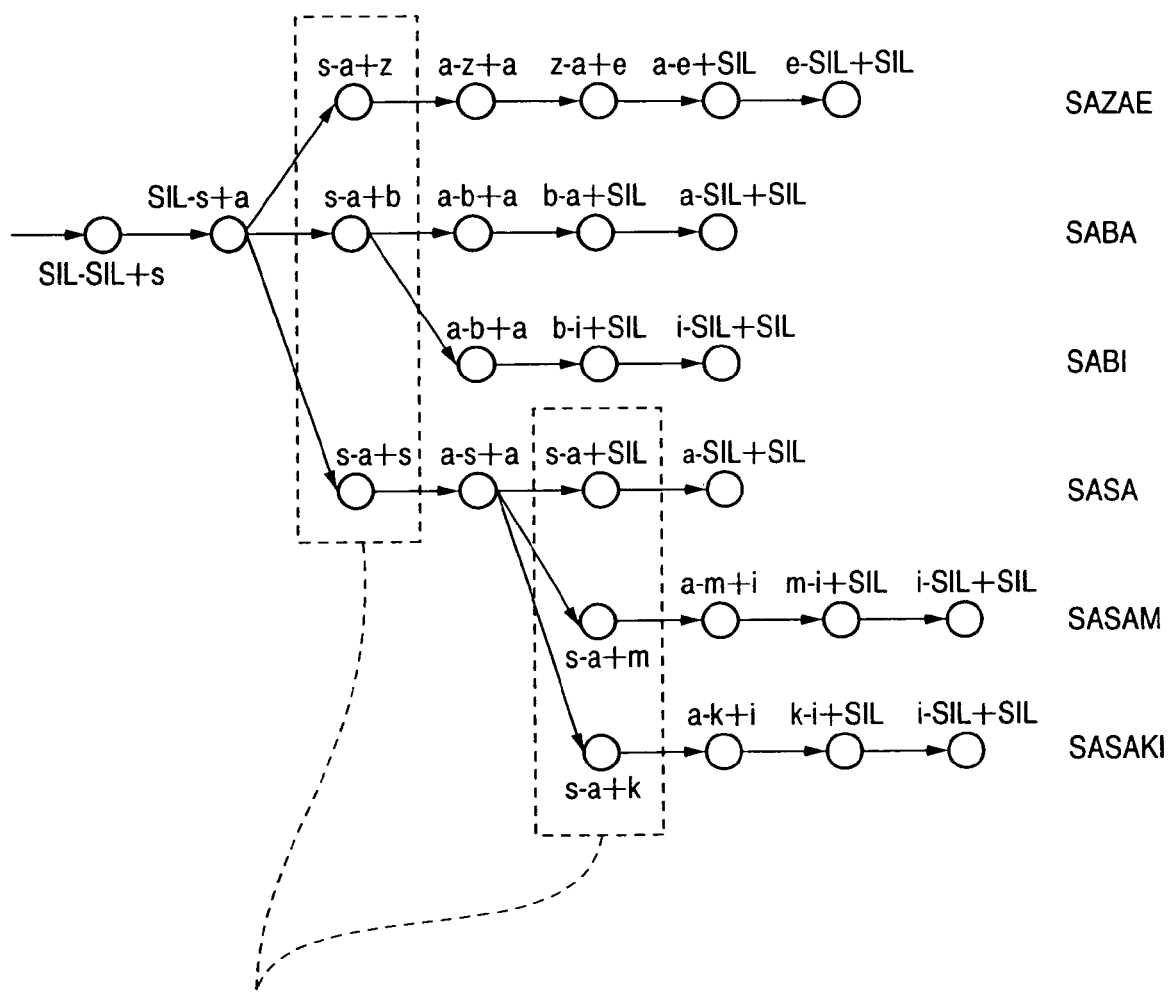
FIG. 9 is a view for explaining how acoustic models are switched in likelihood calculation in the third modification.

FIG. 9 shows this case. Referring to FIG. 9, M=3 is set, and the precision acoustic model 103 is used to perform calculation for states contained in phonemes occurring immediately after three or more branches (the states contained in the phonemes "s−a+z", "s−a+b", and "s−a+s" immediately after the occurrence of three branches from "SIL−s+a", and the states contained in the phonemes "s–a+SIL", "s–a+m", and "s–a+k" immediately after the occurrence of three branches from "a–s+a"), and the rough acoustic model 104 is used to perform calculation for the remaining states (regardless of whether the current state exists near the word start). This makes it possible to efficiently perform high-precision likelihood calculation in a state with a large number of branches regardless of whether the current state exists near the word start.

Referring to FIG. 9, calculation is performed for states contained in phonemes immediately after the occurrence of branches. However, the present invention is not limited to this, and a range determined as that near branches may be a range other than that described above (e.g., one phoneme before branches, five states immediately after the occurrence of branches, and the like).

(Fourth Modification)

In the second and third modifications, acoustic models using a phoneme such as a monophone or triphone as a unit are used. However, the present invention is not limited to this, and a word model having learnt a reference pattern for each recognition target word may be used.

Figure 10:
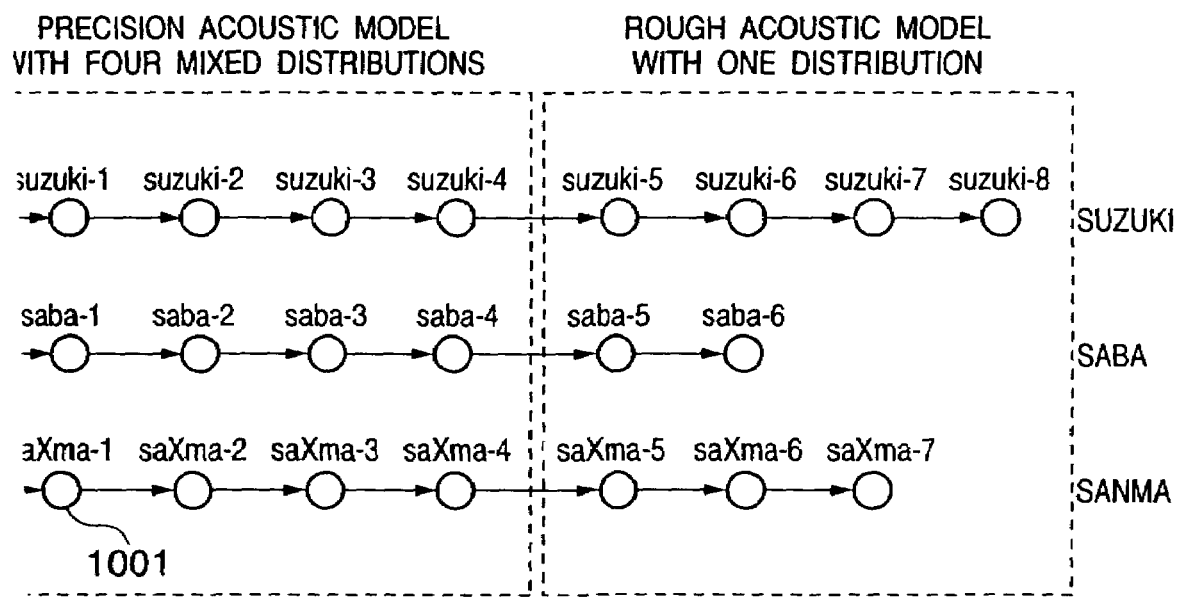
FIG. 10 is a view showing an example of the recognition target word dictionary expressed by a word model in the fourth modification.

FIG. 10 shows a recognition target word dictionary expressed by using a word model according to the fourth modification. Referring to FIG. 10, reference numeral 1001 denotes a state in the word model, and one word is expressed by one or two states (corresponding to the states 302 in the phoneme model). In many word models, phonemes of a given recognition target word do not share states with those of other recognition target words, and no tree is formed as shown in FIG. 10. In such a case as well, the precision acoustic model 103 with a large mixture count can be applied to states within N states from a word start, and the rough acoustic model 104 with a small mixture count can be applied to states after the Nth state. According to the method of switching acoustic models in accordance with the branch count M of the tree, since no tree is formed, no branching occurs within a word. If, however, the number of branches changes in accordance with a grammar for recognition, the above method can be applied in the same manner.

Figure 11:
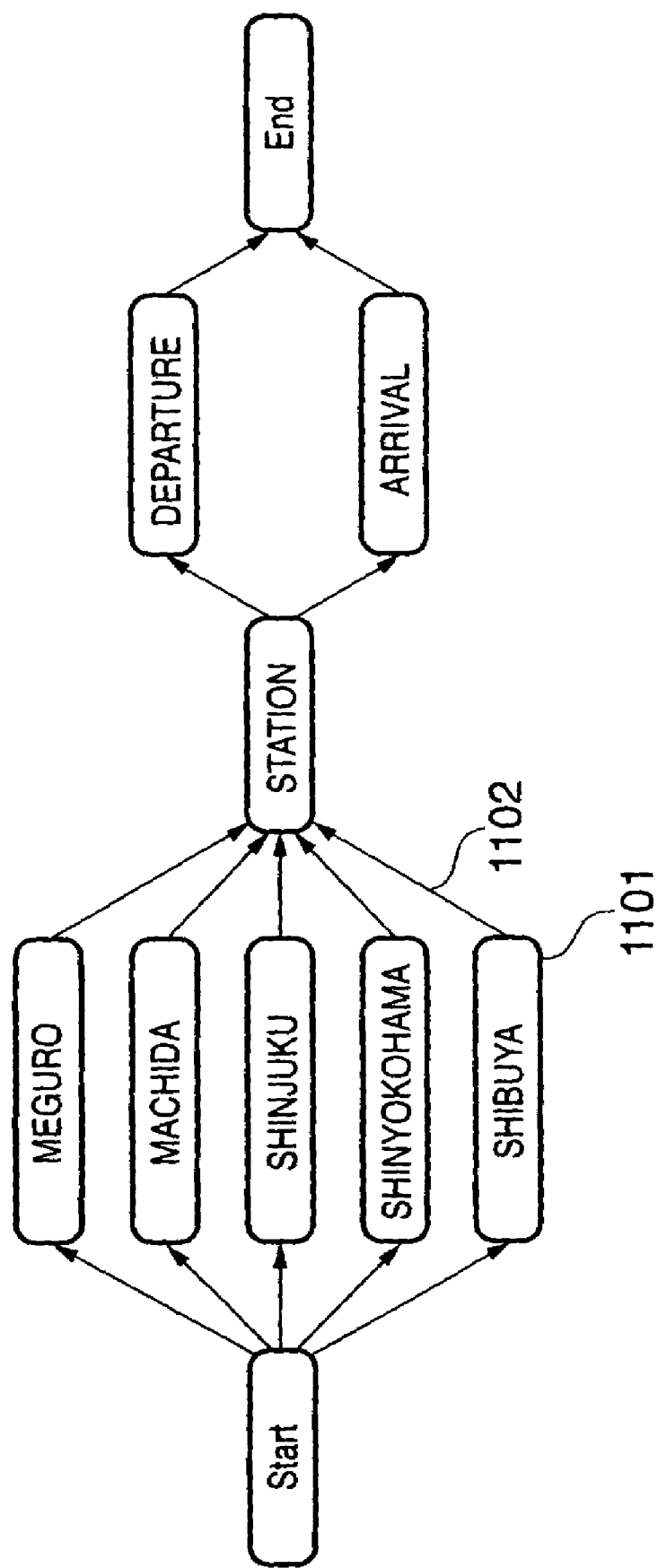
FIG. 11 is a view showing an example of a recognition grammar in the fourth modification.

FIG. 11 shows an example of a recognition grammar. Referring to FIG. 11, reference numeral 1101 denotes a recognition target word; and 1102, a link which connects recognition target words. Any recognition results other than word sequences which allow to track links from "Start" to "End" are not accepted as results even if the recognition results exhibit high likelihoods. In this case, depending on a branch count L in the grammar, acoustic models can be switched even for respective word models. Assume that in FIG. 11, when branch count L=3 in the grammar is set. In this case, at "station names" (Meguro, Machida, Shinjuku, Shinyokohama, and Shibuya), the branch count is 5, which is larger than L, and hence likelihood calculation is performed for these word models by using the precision acoustic model 103. At the word "station", the branch count is 1. At the words "departure" and "arrival", the branch count is 2. Therefore, likelihood calculation is performed for them by using the rough acoustic model 104.

(Fifth Modification)

The fourth modification has exemplified the case wherein word models are used in the method of switching acoustic models in accordance with the branch count in the recognition grammar. However, this method can also be applied to a case wherein phoneme models are used. In this case, as shown in FIG. 4, even if the current state falls within N states from a word start as shown in FIG. 4, or the branch count of a recognition target word tree is equal to or more than M as shown in FIG. 9, control may be performed to use the rough acoustic model 104 for words ("station", "departure", and "arrival") at each of which the branch count in a grammar like that shown in FIG. 11 is less than L. In addition, there may be prepared a function for changing a word count N from a word start or the branch count M of a tree in accordance with the branch count L in the grammar, thereby changing N and M in accordance with L.

(Sixth Modification)

In the phoneme model described above, branching occurs on a phoneme basis, and phonemes are shared between words. However, phonemes may be shared between states. In this case, a state in a phoneme is shared with another phoneme by performing clustering such that the same state is used as the state at the same position of a given phoneme as that of another phoneme. In this case, therefore, even in the same phoneme, the precision acoustic model and rough acoustic model may be selectively used for each state depending on the state count N from a word start or the state branch count M.

(Seventh Modification)

In each modification of the above embodiment, the precision acoustic model and rough acoustic model are selectively used at the time of likelihood calculation in accordance with the state count N from a word start, the branch count M of a tree, or the branch count L in the grammar. In this modification, however, all likelihoods are calculated first by the rough acoustic model 104, and a likelihood is re-calculated by using the precision acoustic model 103 for only a state which falls within the state count N from a word start or corresponds to a branch count of a tree which is equal to or more than M or a branch count in the grammar which is equal to more than L, and exhibits a high likelihood.

Figure 12:
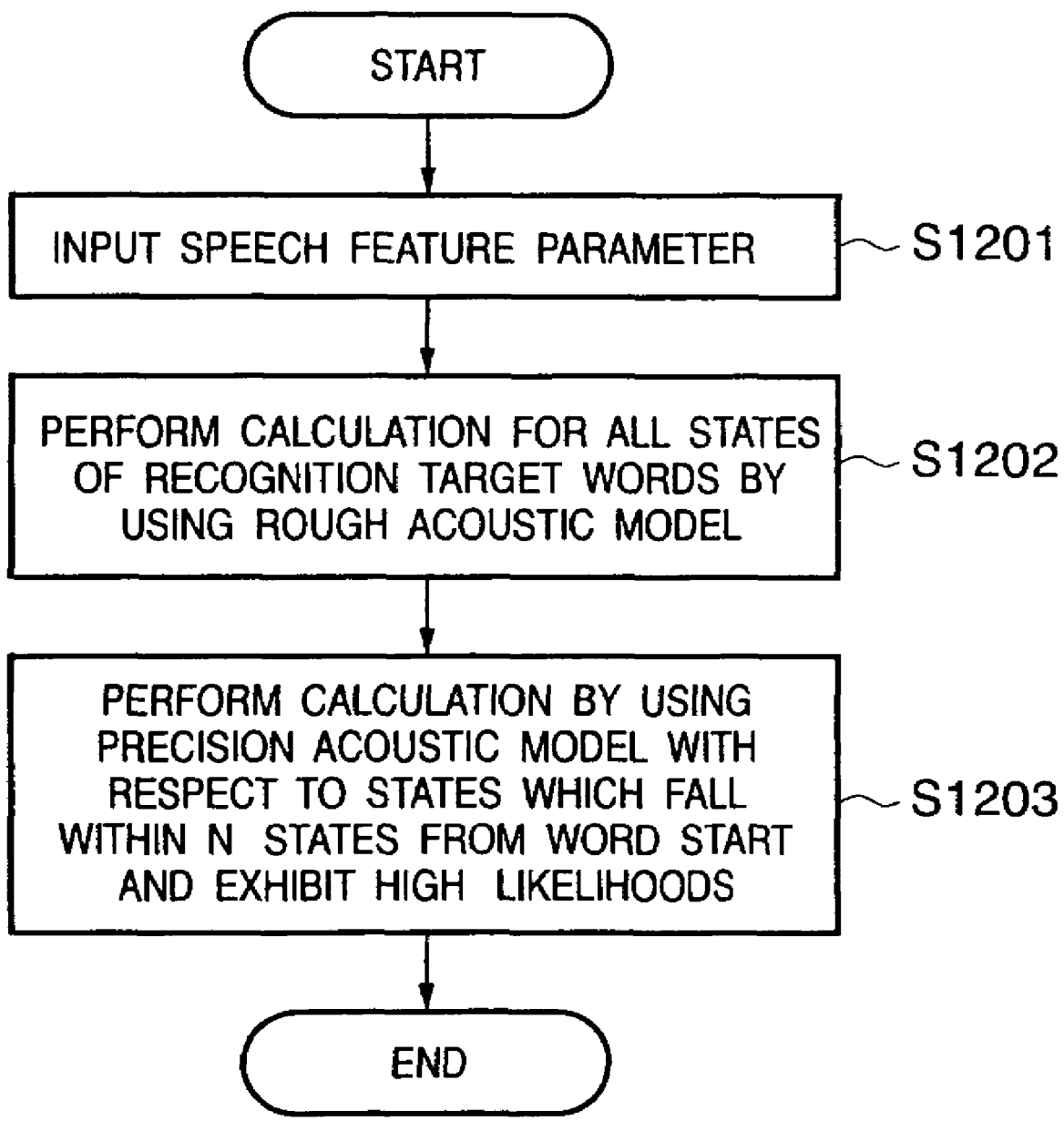
FIG. 12 is a flowchart showing a likelihood calculation sequence in the seventh modification.

FIG. 12 is a flowchart showing a likelihood calculation sequence in this modification. FIG. 13 is a view for explaining an example of processing in the likelihood calculation. First of all, when speech is input to the likelihood calculating unit 105 in step S1201, likelihood calculation is performed for all the states (excluding states which state transition cannot reach at the current time) by using the rough acoustic model 104 in step S1202, as shown in FIG. 13.

Subsequently, in step S1203, likelihood re-calculation is performed by using the precision acoustic model 103 only for states which fall within N states from a word start and exhibit high likelihoods calculated by the rough acoustic model 104. In the case shown in FIG. 13, the likelihoods of the respective states which fall within the N states are referred to, and states which exceed a predetermined threshold (referring to FIG. 13, a total of four states including the third state of "SIL–s+a", the first state of "s–a+b", and the first and second states of "s–a+X") are selected. Likelihood re-calculation is then performed for only these states by using the precision acoustic model 103. The calculation results are made to replace the likelihoods calculated by the rough acoustic model 104. This makes it possible to further increase the processing speed because high-precision calculation is performed for only states, of the N states from the word start, which exhibit high likelihoods.

In step S1203, the condition "within the N states from the word start" for re-calculation using the precision acoustic model 103 may be replaced with "near a node where the branch count of the tree is M or more" or "any word exhibiting the branch count L or more in the grammar". In addition, a method of selecting states exhibiting likelihoods is not limited to any specific method. For example, K states may be selected from all the states in decreasing order of likelihood, or states whose likelihood differences from the highest likelihood fall within a predetermined threshold may be selected.

(Eighth Modification)

In each form of the embodiment described above, the precision acoustic model 103 and rough acoustic model 104 are differentiated in accordance with the number of Gaussian distributions mixed or a phoneme unit. However, the present invention is not limited to this. Any method of differentiating the models can be used as long as it produces a difference in likelihood calculation speed.

For example, as a method of differentiating the precision acoustic model 103 and rough acoustic model 104 by phoneme units, the method of using a triphone for the precision acoustic model 103 and a monophone for the rough acoustic model 104 is used. Methods other than this method are conceivable. For example, triphones are used for both the precision acoustic model 103 and the rough acoustic model 104 such that triphones having similar characteristics are clustered to use a common model for the rough acoustic model 104, whereas no clustering is performed for the precision acoustic model 103 or the number of clusters in clustering is set to be larger than that for the rough acoustic model 104.

(Ninth Modification)

Each form of the embodiment described above has exemplified the method of switching the two acoustic models, i.e., the precision acoustic model 103 and the rough acoustic model 104, at the time of likelihood calculation, in accordance with the state count N from a word start, the branch count M of a tree, or the branch count L in the grammar. However, the present invention is not limited to this, and three or more acoustic models with different precisions may be prepared. In this case, the present invention can be realized by preparing the state count N from a word start, the branch count M of a tree, or the branch count L in the grammar in accordance with the number of models in each method. If, for example, four models are to be used, three thresholds are prepared.

OTHER EMBODIMENTS

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

For example, the function of the speech recognition apparatus according to the present invention can be implemented by a general-purpose computer apparatus (e.g., a personal computer or workstation).

Figure 14:
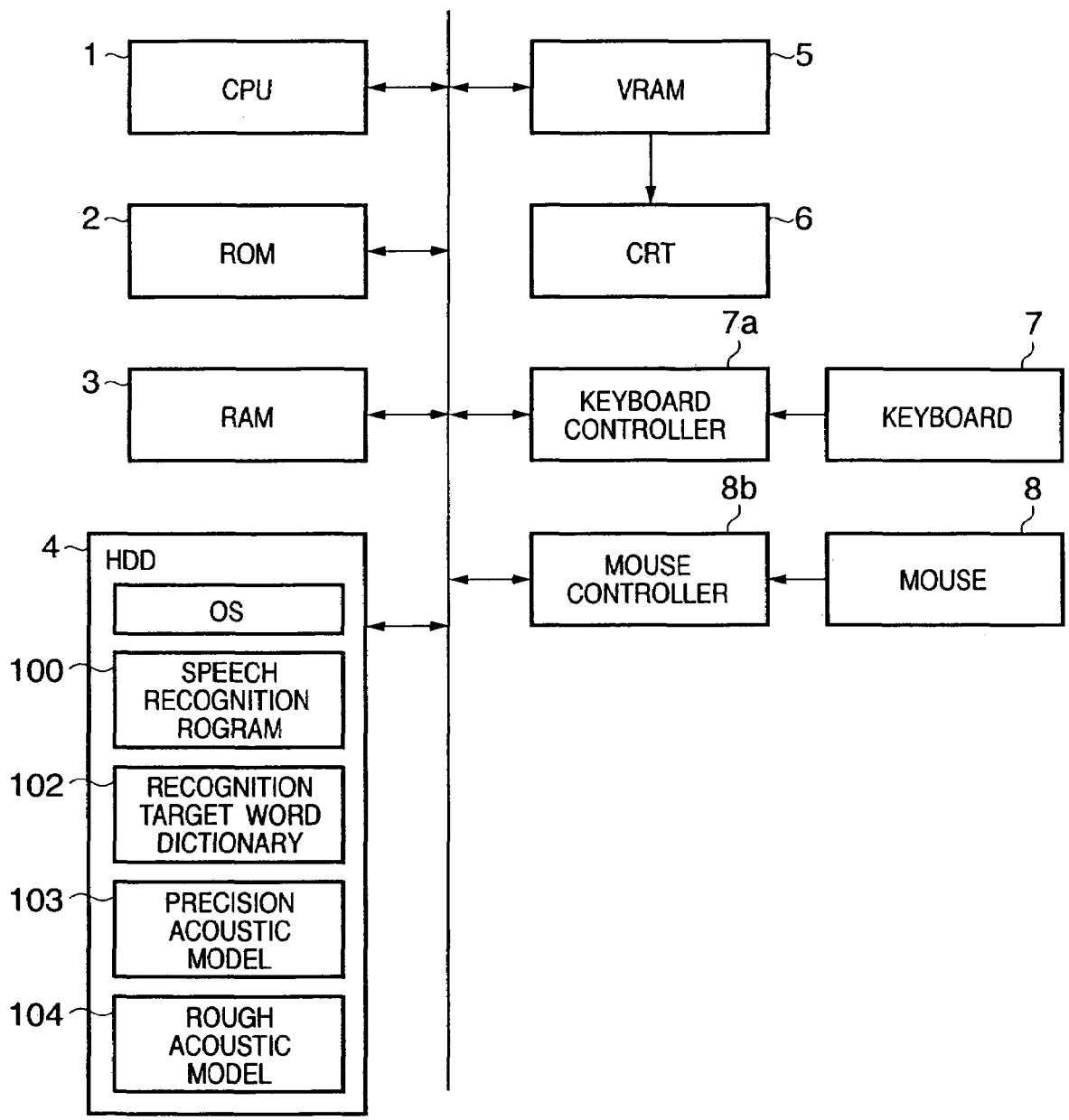
FIG. 14 is a view showing an example of the arrangement of a computer functioning as the speech recognition apparatus of the present invention.
Figure 15:
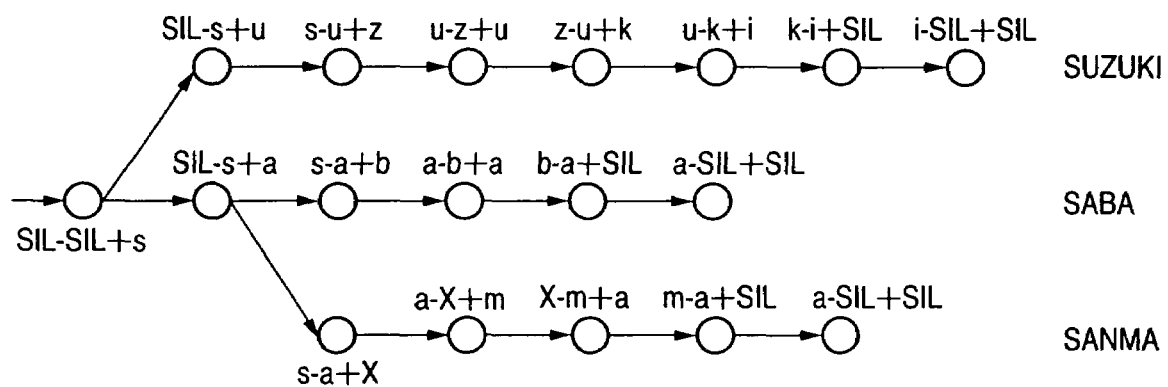
FIG. 15 is a view showing an example of a tree formed from recognition target words.

FIG. 14 is a view showing an example of the arrangement of a computer which implements the function of the speech recognition apparatus according to the present invention.

The computer in FIG. 14 comprises the following components in addition to a CPU 1 which controls the overall apparatus, a ROM 2 which stores a boot program, permanent data, and the like, a RAM 3 which functions as a main memory.

An HDD 4 is a hard disk device, in which a speech recognition program 100, the recognition target word dictionary 102, the precision acoustic model 103, and the rough acoustic model 104 are stored as well as an OS.

A VRAM 5 is a memory in which image data to be displayed is expanded. Expanding image data or the like in this memory allows the data to be displayed on a CRT 6 as an example of a display apparatus. Reference numerals 7 and 8 respectively denote a keyboard and mouse which are used for various kinds of input operations and are respectively connected to a keyboard controller 7a and mouse controller 6b which transmit interruption signals to the CPU 1.

The arrangement of the computer which functions as the speech recognition apparatus of the present invention has been roughly described above. The speech recognition program 100 described above implements the functions of the acoustic analyzing unit 101, likelihood calculating unit 105, and recognition result output unit 106.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-191460 filed on Jun. 29, 2004, the entire contents of which are hereby incorporated by reference herein.

What is claimed is:

1. A speech recognition apparatus comprising:
   (a) a memory for storing:
      (i) a word dictionary having recognition target words, said word dictionary comprising a tree structure in which the recognition target words share a predetermined speech unit;
      (ii) a first acoustic model which expresses a reference pattern of the speech unit by one or more states; and
      (iii) a second acoustic model which is lower in precision than said first acoustic model;
   (b) selection means for selecting a state of interest from the tree structure;
   (c) checking means for checking the number of branches of the selected state; and
   (d) likelihood calculation means for calculating a likelihood of an acoustic feature parameter for states immediately succeeding the selected state using the first acoustic model, if the number of branches of the selected state is equal to or more than a predetermined value, and otherwise calculating a likelihood of an acoustic feature parameter for states immediately succeeding the selected state using the second acoustic model;
   wherein in calculating a likelihood with respect to a state of interest by using said second acoustic model, if likelihood calculation using said first acoustic model has been performed for a state having the same speech unit alignment as that of the state of interest, said likelihood calculation means reuses a result of the likelihood calculation as a result of likelihood calculation for the state of interest.

2. The apparatus according to claim 1, wherein with respect to states for which said selection means has selected said second acoustic model, said likelihood calculation means calculates likelihoods by using said second acoustic model and re-calculates likelihoods by using said first acoustic model with respect to only states which exhibit a likelihood higher than a threshold.

3. The apparatus according to claim 1, wherein with respect to states for which said selection means has selected said second acoustic model, said likelihood calculation means calculates likelihoods by using said second acoustic model and re-calculates a likelihood by using said first acoustic model with respect to only a predetermined number of states of the states which are selected in decreasing order of likelihood.

4. The apparatus according to claim 1, wherein the number of mixed distributions which express said second acoustic model is smaller than the number of mixed distributions which express said first acoustic model.

5. The apparatus according to claim 1, wherein
   said first acoustic model is a triphone model, and
   said second acoustic model is a monophone model.

6. A speech recognition method of performing speech recognition in a speech recognition apparatus by using (i) a word dictionary having recognition target words, the word dictionary comprising a tree structure in which the recognition target words share a predetermined speech unit, (ii) a first acoustic model which expresses a reference pattern of the speech unit by one or more states, and (iii) a second acoustic model which is lower in precision than the first acoustic model, the method comprising the steps of:
   selecting a state of interest from the tree structure;
   checking the number of branches of the selected state; and
   calculating a likelihood of an acoustic feature parameter for states immediately succeeding the selected state using the first acoustic model, if the number of branches of the selected state is equal to or more than a predetermined value, and otherwise calculating a likelihood of an acoustic feature parameter for states immediately succeeding the selected state using the second acoustic model;
   wherein in calculating a likelihood with respect to a state of interest by using said second acoustic model, if likelihood calculation using said first acoustic model has been performed for a state having the same speech unit alignment as that of the state of interest, said likelihood calculation means reuses a result of the likelihood calculation as a result of likelihood calculation for the state of interest.

7. A program for implementing a speech recognition method defined in claim 6 by using a computer.

8. A computer-readable storage medium storing executable instructions for causing a computer to perform the method of claim 6.

* * * * *